(12) United States Patent
Koide

(10) Patent No.: US 6,645,570 B2
(45) Date of Patent: Nov. 11, 2003

(54) SURFACE TREATMENT METHOD

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/128,501

(22) Filed: Apr. 24, 2002

(65) Prior Publication Data

US 2002/0187279 A1 Dec. 12, 2002

(30) Foreign Application Priority Data

Apr. 27, 2001 (JP) ........................................ 2001/131692
Sep. 26, 2001 (JP) ........................................ 2001/293850
Mar. 20, 2002 (JP) ........................................ 2002/078423

(51) Int. Cl.$^7$ .................................................. C08F 2/48
(52) U.S. Cl. ................. 427/508; 427/248.1; 427/255.4; 427/282; 427/553; 427/558; 427/595
(58) Field of Search ................................ 427/508, 553, 427/558, 248.1, 282, 255.4

(56) References Cited

U.S. PATENT DOCUMENTS 6,117,497 A    9/2000   Murahara et al. ........... 427/581

FOREIGN PATENT DOCUMENTS

JP              6-340759         12/1994

OTHER PUBLICATIONS

English Abstract of JP 9–241409 (Sep. 16, 1997).
English Abstract of JP 6–9803 (Jan. 18, 1994).
Austrian Search Report in Application No. 200202487–5. (No date avail.).

*Primary Examiner*—Bernard Pianalto
(74) *Attorney, Agent, or Firm*—Fitzpatrick, Cella, Harper & Scinto

(57) ABSTRACT

In a surface treatment method of treating the surface of a material to be treated, by irradiating with light the material to be treated and a mediating material in contact with each other, the mediating material itself causes substantially no interaction upon irradiation with light. The surface of the material to be treated is treated by provision of a chemical reaction field, in which a substituent of the material to be treated and an atom of atomic group of the mediating material is induced by excitation, by irradiating with light by using the logical product of the contact interface between the material to be treated and the mediating material and the light irradiation region, thereby causing and progressing bonded state transition.

14 Claims, 7 Drawing Sheets

SURFACE TREATMENT METHOD

BACKGROUND OF THE INVENTION

1. Field of the Invention

The present invention relates to a method of performing a treatment such as modification, deposition, or etching on the surface of a solid material and a material treated by the method and, more particularly, to a method of giving liquid repellency to a solid material surface and a material treated by the method.

More specifically, the present invention relates to a method of giving liquid repellency only to the surface of a solid material containing a polymer having on its side chain a single bonding group of a carbon atom and hydrogen atom, by dissociating hydrogen atoms from the solid material surface and at the same time substituting with a carbon fluoride CnFm (n=1, 2, 3, . . . , m=2n, 2n+1) group, and a material treated by the method.

2. Related Background Art

Conventionally, a functional solid material has been so developed that its own physical properties are effectively utilized. However, various physical properties are required in device applications and the like, so it is becoming more and more difficult for any single bulk material to well satisfy the required performance or characteristics. In particular, a fluorine resin is used in various purposes by making use of its characteristic features, such as inertness, water repellency, oil repellency, and resistance to scratching, resulting from low surface energy. For example, a fluorine resin is singly molded into parts and products having diverse shapes or used in the form of a film. Also, a fluorine resin film having one surface which is given hydrophilic nature is used to cover parts having various shapes. Furthermore, a fluorine resin is dissolved in a solvent and used in the form of a coating film. Thus, a fluorine resin is used in a wide variety of applications and hence regarded as one of very useful materials.

Even when this fluorine resin is in the form of a film, however, if a bulk region of a certain size is present in the film, in this bulk region the physical properties unique to the fluorine resin appear. For example, a low hardness decreases the cutting resistance, so the film is readily cut with a knife. In the case of molding, a high glass transition point decreases the flowability, and this makes precision molding difficult to perform. Also, in the case of solvent coating the material is limited to a fluorine polymer which dissolves in a solvent, so the inertness, water repellency, oil repellency, and resistance to scratching do not reach the characteristics of PTFE. Additionally, a high curing temperature restricts the base material that can be coated. Furthermore, the original physical properties of a fluorine resin also pose problems: a large linear expansion coefficient causes deformation in a high-temperature environment, and a high chargeability limits uses in the vicinity of charge carriers.

If, therefore, it is possible, instead of processing a fluorine resin material itself, to add the characteristics of a fluorine resin only to surface region thereof while the original bulk physical characteristics of a base material made of an organic material or organic-inorganic composite material are fully utilized, a wider variety of functions can be achieved.

As this method, Japanese Patent Application Laid-Open No. 6-340759 discloses a method of modifying a plastic material having a C—H bond by exciting light. That is, this prior art reference describes a method by which, in an atmosphere of a compound or mixture which contains a first atom having a bond energy of 80.6 kcal/mol or more with respect to a hydrogen atom and a second atom or atomic group whose bond energy with respect to the first atom is smaller than the optical energy of the exciting light, the interface between the plastic material and the compound or mixture is directly or indirectly irradiated with ultraviolet light having a photon energy of 80.6 kcal/mol or more. In this manner, the plastic material is dehydrogenated via the first atom and substituted with the second atom or atomic group. As the compound or mixture, fluorine compound examples are presented in Examples 11, 27, and 31.

SUMMARY OF THE INVENTION

In the configuration of Japanese Patent Application Laid-Open No. 6-340759 described above, however, variations in the manufacturing conditions produce large variations in the performance of the contact angle owing to the substitution mechanism. Since this requires severe management of the manufacturing conditions, it is difficult to form highly stably surface-treated samples with high yield.

That is, the present inventors conducted experiments by the method described in (Example 2) of Japanese Patent Application Laid-Open No. 6-340759. Consequently, when a sample was irradiated with an ArF laser while being in close contact with an aqueous solution prepared by dissolving 2 g of boric acid ($H_3BO_3$) in 50 cc of water, the aqueous boric acid solution absorbed light upon ArF laser irradiation, and this worsened the efficiency of the substitution reaction. Additionally, the thickness of the aqueous boric acid solution sometimes produced variations in the substitution reaction.

Accordingly, the present inventors studied a substitution mechanism for efficiently performing substitution without any variations produced by the thickness of the aqueous boric acid solution or the like, and have found a novel substitution mechanism, thereby deriving a surface treatment stabilization method. In particular, the present inventors have found a method by which a physical property irreversible process logically holds in a method of adding high liquid repellency to the surface of a plastic material having a C—H bond in its surface layer.

It is an object of the present invention to provide a surface treatment method capable of extending application regions by maintaining both the surface characteristics and bulk characteristics, and capable of achieving both high liquid repellency and high productivity.

To achieve the above object, the present invention provides a surface treatment method of treating the surface of a material to be treated, by irradiating with light the material to be treated and a mediating material in contact with each other, characterized in that the mediating material itself causes substantially no interaction upon irradiation with light, and the surface of the material to be treated is treated by provision of chemical reaction field, in which a substituent of the material to be treated and an atom of atomic group of the mediating material is induced by excitation at the same time, by irradiating with light by using the logical product of the contact interface between the material to be treated and the mediating material and the light irradiation region, thereby causing and progressing bonded state transition.

The method is also characterized in that bond energy by which the substituent induced by excitation from the material to be treated in the chemical reaction field is subjected to captive transition bonding by the atom or atomic group induced by excitation from the mediating material is larger than a larger one of bond energy between the substituent of the material to be treated and a matrix atom and bond energy between the atom or atomic group of the mediating material and the matrix atom.

The method is further characterized in that the light which irradiates the material to be treated and the mediating material has a wavelength having photon energy larger than a larger one of bond energy between the substituent of the material to be treated and a matrix atom and bond energy between the atom or atomic group of the mediating material and the matrix atom.

Also, the present invention for achieving the above object is a method of treating the surface of a material to be treated having a single bonding group of a carbon atom and hydrogen atom on the surface, characterized in that while the material to be treated is in contact with a liquid mediating material which is an aggregate of a polymer having on its main chain an ether bonding group and a carbon fluoride CnFm (n=1, 2, 3, . . . , m=2n or 2n+1) group, the contact interface between the material to be treated and the mediating material is irradiated with ultraviolet radiation having a wavelength of 221.4 to 351.6 nm, thereby substituting a hydrogen atom in the single bonding group of a carbon atom and the hydrogen atom on the surface of the material to be treated with the carbon fluoride group in the mediating material, and modifying the surface of the material to be treated.

DETAILED DESCRIPTION OF THE PREFERRED EMBODIMENTS

The characteristic feature of the present invention will be described in detail below.

This characteristic feature of the present invention is to perform a surface treatment by providing a chemical reaction field, in which a substituent of a material to be treated is induced by excitation and at the same time an atom or atomic group of a mediating material which causes substantially no interaction upon irradiation with light when used alone is induced by excitation, by irradiating with light the material to be treated and the mediating material in contact with each other by using the logical product of the contact interface between the material to be treated and the mediating material and the light irradiation region, thereby causing and progressing bonded state transition.

In the present invention, a material which when used alone causes substantially no interaction upon irradiation with light is used as the mediating material. Therefore, the energy obtained by irradiation with light is not used in excitation transition of the mediating material.

Accordingly, no variations are produced in the substitution reaction by the thickness of the mediating material in contact with the material to be treated. So, the substitution reaction can be performed more efficiently.

Also, a chemical reaction field in which the substituent in the material to be treated is induced by excitation and at the same time the atom or atomic group in the mediating material is induced by excitation is provided by the contact interface between the material to be treated and the mediating material. This improves the efficiency of bonded state transition and makes efficient substitution feasible.

This mechanism of treating only the surface of a material to be treated according to the present invention will be described in detail below with reference to FIG. 4.

This embodiment relates to an example in which a liquid mediating material which is an aggregate of a polymer having on its main chain an ether bonding group and a carbon fluoride CnFm (n=1, 2, 3, . . . , m=2n or 2n+1) group is used as the mediating material which when used alone causes substantially no interaction upon irradiation with light, and a material having on its surface a single bonding group of a carbon atom and hydrogen atom is used as the material to be treated.

Figure 4:
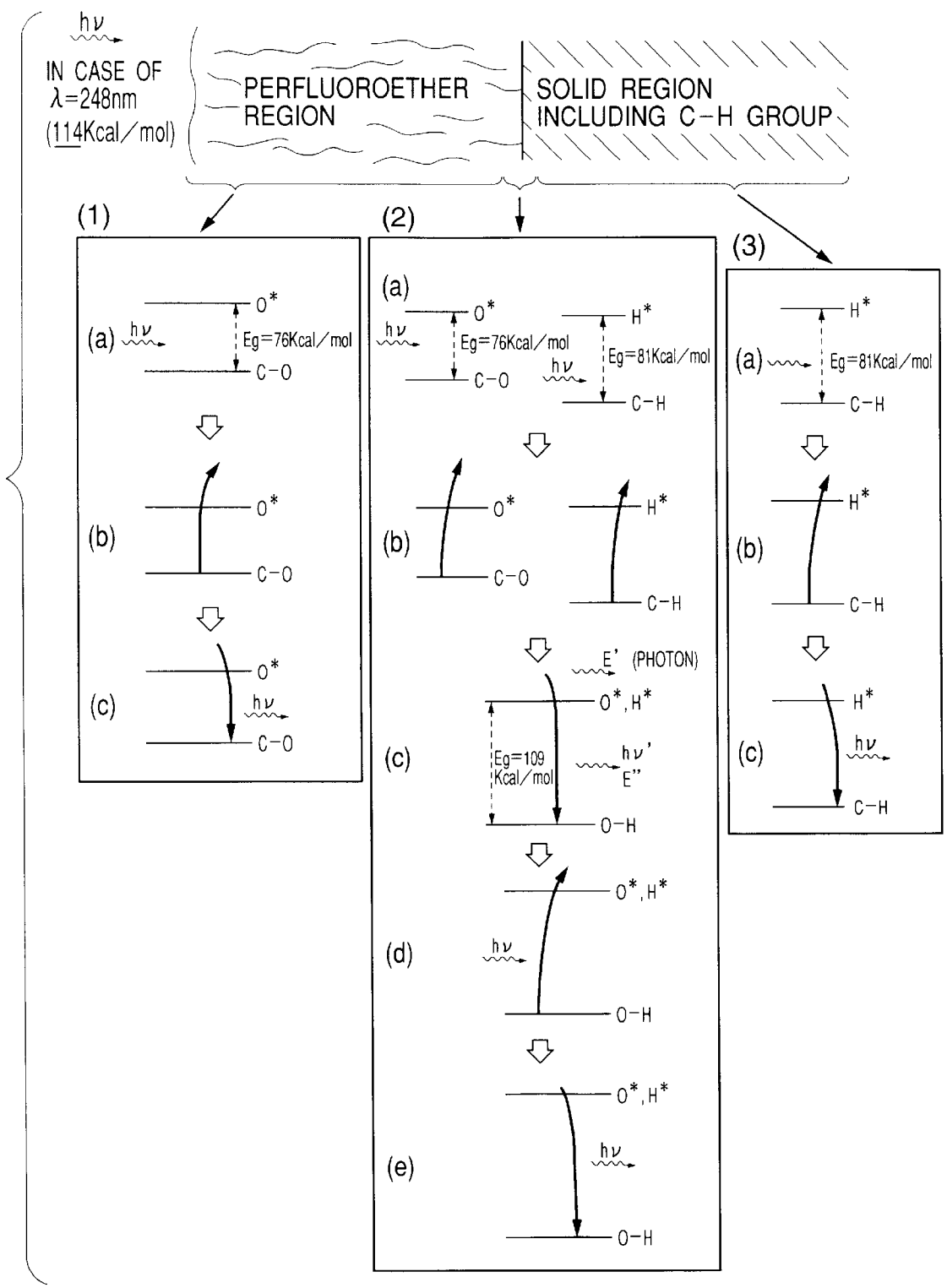
FIG. 4 is a view showing the mechanism of treating the surface of a material to be treated according to this embodiment.

FIG. 4 is a view for explaining the mechanism of treating the surface of a material to be treated according to the present invention. Referring to FIG. 4, (1) indicates a mediating liquid material region; (2), a boundary region between a mediating liquid material and a material to be treated having a C—H group on its side chain; and (3), a region of the material to be treated. (a) to (c) in (1), (a) to (e) in (2), and (a) to (c) in (3) schematically represent photochemical reactions in the respective regions when these regions are irradiated with ultraviolet radiation.

In the present invention, an exposed, developed negative photosensitive resin containing an alicyclic epoxy resin as its main component is used as the material to be treated. Also, perfluoroether (chemical name: perfluoropolyoxetane, trade name: DEMNUM (manufactured by DAIKIN INDUSTRIES, LTD.) is used as the mediating material.

A krypton fluorine excimer laser beam (114 kcal/mol) emitted from an ultraviolet laser oscillator and having an optical wavelength of 248.4 nm irradiates perfluoropolyether as a mediating material represented by the following formula. Chemical formula of perfluoropolyether

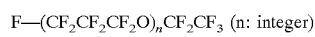

F—(CF$_2$CF$_2$CF$_2$O)$_n$CF$_2$CF$_3$ (n: integer)

The emitted ultraviolet radiation (excimer laser) is transmitted through the perfluoropolyether with no light absorption, and reaches the surface of a solid material 7 to be treated. However, in terms of quantum optics, the passing of ultraviolet photons strictly means that no photon energy absorption takes place; if an energy level which transits by absorbing photons exists, absorption of photons occurs to produce an action. That is, a photochemical reaction can be locally generated by providing an energetically stable level.

In the mediating liquid material, as indicated by (1)-(a), the energy exceeding the potential barrier of the single bond energy of a carbon atom and oxygen atom is about 76 kcal/mol. When the ultraviolet wavelength is about 357 nm or less, the photon energy is about 76 kcal/mol or more, so this energy exceeds the potential barrier of the single bond energy of a carbon atom and oxygen atom as an ether group. Accordingly, as indicated by (1)-(b), an oxygen atom can dissociate as an ion from a carbon atom. However, an oxygen atom alone is unstable, so the life of an oxygen atom alone is short. Therefore, even when dissociating as an ion from a carbon atom, an oxygen atom immediately radiates a photon having the same energy to return to the original level ((1)-(c)). That is, when observed from the outside this is equivalent to induced radiation; a photon having the same phase, same polarized light, same wavelength, and same propagation direction is radiated, so the observation indicates that no changes have taken place. That is, this is equivalent to the occurrence of nothing.

In the material to be treated, on the other hand, as indicated by (3)-(a), the energy exceeding the potential barrier of the single bond energy of a carbon atom and hydrogen atom is 80.6 kcal/mol. When the ultraviolet wavelength is 351.6 nm or less, the photon energy is 80.6 kcal/mol or more, so this energy exceeds the potential barrier of the single bond energy of a carbon atom and hydrogen atom. Accordingly, as indicated by (3)-(b), a hydrogen atom can dissociate as an ion from a carbon atom. However, a hydrogen atom alone is unstable, so the life of a hydrogen atom alone is short. Therefore, even when dissociating as an ion from a carbon atom, a hydrogen atom immediately radiates a photon having the same energy to return to the original level ((3)-(c)). That is, when observed from the outside this is equivalent to the occurrence of no change, similar to the above case.

Figure 6B:
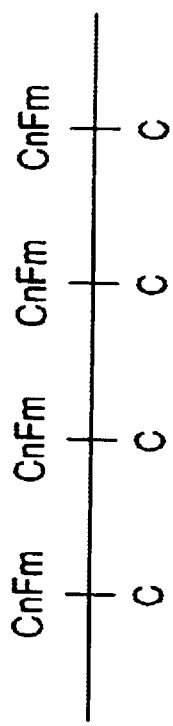
FIGS. 6A, 6B and 6C are schematic views showing the surface conditions of the materials to be treated according to the embodiment and the comparative example.
Figure 6C:
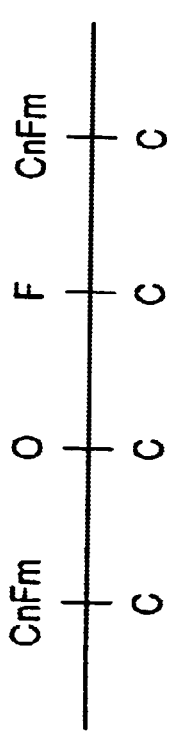
Figure 6A:
Figure 6A:
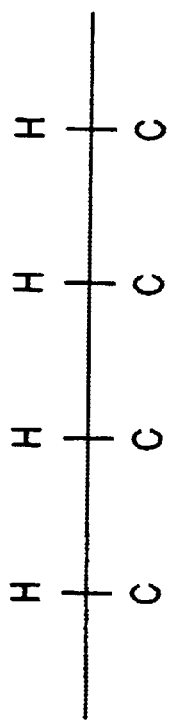

However, by providing a new level (a so-called donor or acceptor level) at which oxygen atoms dissociated as ions are captured, absorption of ultraviolet photons occurs, and this can bring about a photochemical reaction. In the present invention, this capture level is provided on the surface of a solid material to be treated, i.e., on the contact interface between the mediating liquid material and the material to be processed having a C—H group on its side chain. This will be explained below. An organic material is formed on the surface of a solid material to be treated, and single bonds of carbon atoms and hydrogen atoms are present on the side chain of an organic material polymer (FIG. 6A). On the other hand, single bonds of oxygen atoms and carbon atoms are present in the mediating liquid material in contact with the solid material. As indicated by (2)-(a), the energy exceeding the potential barrier of the single bond energy of a carbon atom and oxygen atom is about 76 kcal/mol. Also, the potential barrier energy of the single bond of a carbon atom and hydrogen atom on the organic polymer side chain is 80.6 kcal/mol. When the ultraviolet wavelength is 351.6 nm or less, the photon energy is 80.6 kcal/mol or more. This energy exceeds the potential barrier of the single bond energy of a carbon atom and oxygen atom and also exceeds the potential barrier of the single bond energy of a carbon atom and hydrogen atom. That is, this energy induces dissociation of an oxygen atom and hydrogen atom. As indicated by (2)-(b), therefore, an oxygen atom and hydrogen atom dissociate as ions from carbon atoms.

The single bond energy of an oxygen atom and hydrogen atom is about 109 kcal/mol, i.e., larger than about 76 kcal/mol as the potential barrier energy of the single bond of a carbon atom and oxygen atom as an ether group, and larger than 80.6 kcal/mol as the potential barrier energy of the single bond of a carbon atom and hydrogen atom on the organic polymer side chain. Accordingly, when an oxygen atom and carbon atom form a single bond, the energy level potential drops to a deeper stable level. More specifically, with respect to a dissociated oxygen atom and dissociated hydrogen atom, a transition-stable level is provided on the contact interface between the surface of the solid material to be treated and perfluoropolyether as the mediating liquid material.

As indicated by (2)-(c), an oxygen atom and hydrogen atom radiate photons having an energy of about 109 kcal/mol, generating a single bond of these oxygen atom and hydrogen atom.

In practice, the stable state of hydrogen H and oxygen O is pure water $H_2O$, so the photochemical reaction described so far occurs by consuming four ultraviolet photons of 351.6 nm or less.

If the ultraviolet photon energy is equal to or larger than about 109 kcal/mol as the single bond energy of an oxygen atom and hydrogen atom, an oxygen atom and hydrogen atom can of course dissociate as ions as indicated by (2)-(d). However, an oxygen atom and hydrogen atom alone are unstable, so the life of an oxygen atom alone is short. Therefore, even when dissociating as an ion, an oxygen atom immediately radiates a photon having the same energy to return to the original level ((2)-(e)). That is, when observed from the outside this is equivalent to the occurrence of no changes. Also, strictly speaking, it is impossible, according to the Heisenberg uncertainty principle, to observe an ion dissociation process within a very short time; an appropriate explanation is to express this as "unknown" by the quantum theory.

At the same time, perfluoropolyether as the mediating liquid material loses ether groups on its main chain, so carbon fluoride groups ($C_3F_6$ or $C_3F_7$) remain. On the other hand, carbon active groups remain on the surface of the solid material to be treated. This forms an environment in which the carbon fluoride groups unavoidably chemically bond to the carbon active groups on the surface of the solid material. Consequently, the surface of the solid material is fluorinated to achieve water repellency (FIG. 6B).

As a supplementary explanation, the single bond energy of carbon atoms is about 84 kcal/mol. Therefore, when a wavelength of about 336 nm or less is used as ultraviolet radiation to be emitted, carbon atoms unstably transit between dissociation and bonding, and carbon fluoride chemically bonds to the surface of the solid material in the most stable state in which this carbon fluoride is decomposed or combined to any state in a $C_nF_m$ (n=1, 2, 3, . . . , m=2n or 2n+1) group.

As another supplementary explanation, the single bond energy of carbon atoms is about 84 kcal/mol. Therefore, when a wavelength of about 336 nm or less is used as ultraviolet radiation, carbon atoms unstably transit between dissociation and bonding in a direction in which the entropy increases, and carbon fluoride chemically bonds to the surface of the solid material by forming a network in the most stable state in which this carbon fluoride is decomposed or recombined to any state in a $C_nF_m$ (n=1, 2, 3, . . . , m=2n or 2n+1) group and the Gibbs free energy is a minimum.

COMPARATIVE EXAMPLE

Figure 5:
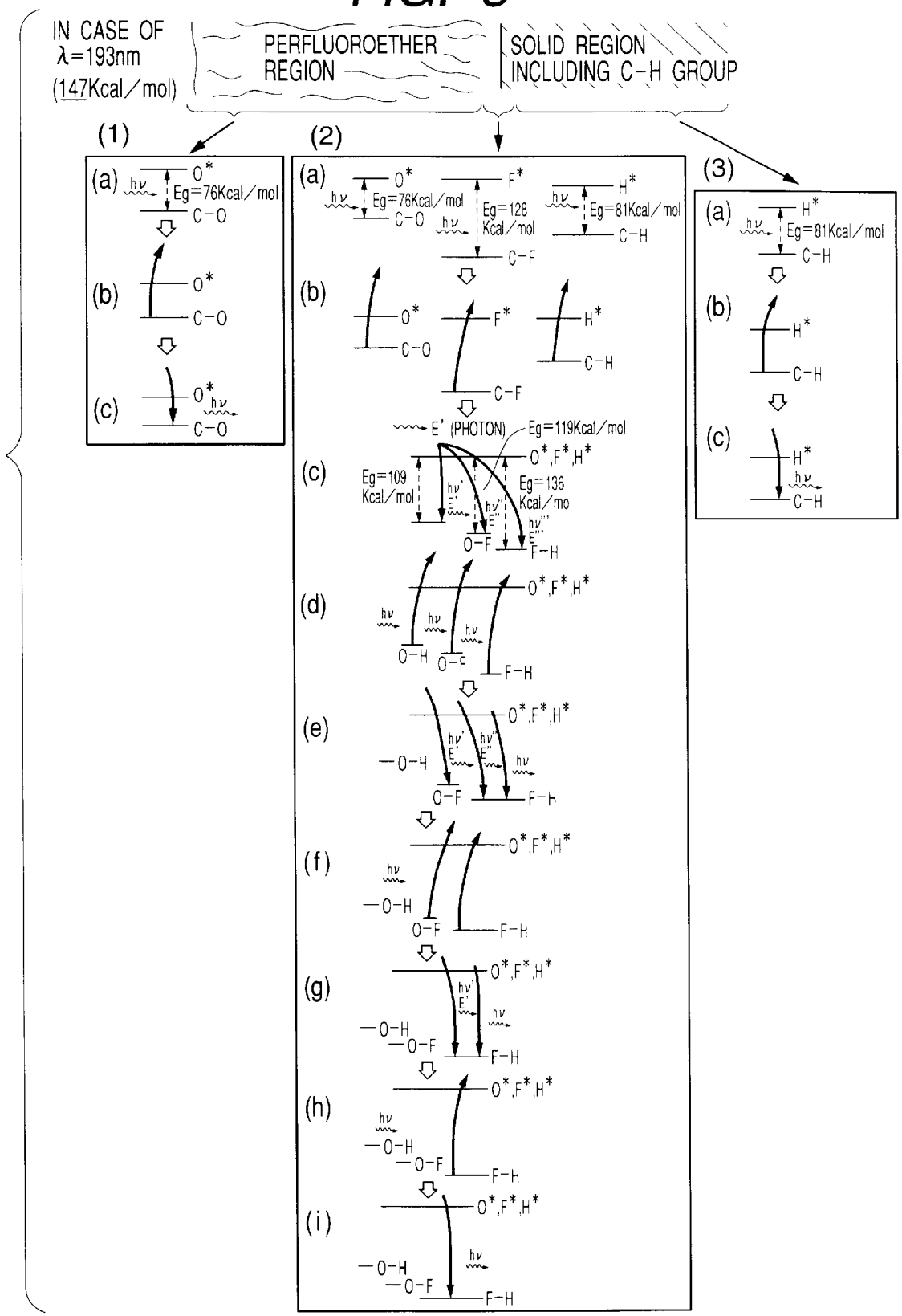
FIG. 5 is a view showing the mechanism of treating the surface of a material to be treated according to the comparative example.

FIG. 5 is a view showing the mechanism of treating the surface of a material to be treated according to a comparative example. (1) indicates a mediating liquid material region; (2), the boundary region between a mediating liquid material and a material to be treated having a C—H group on its side chain; and (3) a region of the material to be treated. FIG. 5 schematically represents photochemical reactions occurring in these regions when they are irradiated with ultraviolet light.

This comparative example is the same as the embodiment except that the ultraviolet laser oscillator 1 emits an argon fluorine excimer laser beam (147 kcal/mol) having an optical wavelength of 193 nm.

The reactions occurring in (1) and (3) are the same as in the embodiment.

In the reaction in (2), the level at which a hydrogen atom dissociated as an ion is captured by an oxygen atom, i.e., at which absorption of ultraviolet photons occurs to bring about a photochemical reaction, is provided by the surface of a solid material to be treated, as in the embodiment.

However, the use of light having an ultraviolet wavelength of 221.4 nm or less, i.e., the use of light having a photon energy of about 128 kcal/mol or more as in this comparative example makes the photochemical reaction unstable. Since the photon energy of an argon fluorine excimer laser beam having an optical wavelength of 193 nm is 147 kcal/mol, this beam has a photon energy larger than 128 kcal/mol described above.

That is, this energy is larger than about 128 kcal/mol as the single bond energy of a carbon atom and fluorine atom. In addition, about 136 kcal/mol as the single bond energy of a carbon atom and fluorine atom is larger than about 109 kcal/mol as the single bond energy of an oxygen atom and hydrogen atom, so the former energy drops to a deeper potential level and becomes more stable. Consequently, a fluorine atom captures a hydrogen atom as indicated by (2) in FIG. 5. For this reason, an ether group loses a transition state to be captured and chemically bonds to the surface of the solid material to change the characteristic in a direction in which the hydrophilic nature increases.

The characteristic is not saturated but exhibits a peak value in accordance with the number of irradiation pulses, presumably because the characteristic appearance process is delayed since the potential barrier of the dissociation energy of a carbon-fluorine single bond is higher than that of the dissociation energy of a carbon-oxygen single bond of an ether group.

When thus compared with the comparative example, the point of this embodiment is as follows. To reliably give liquid repellency to the surface of a solid material to be treated, it is necessary to emit light (light having a photon energy of about 80.6 kcal/mol or more) having a wavelength which gives photon energy higher than 80.6 kcal/mol as the energy of dissociation, from carbon, of a hydrogen atom as a substituent of the material to be treated, and about 76 kcal/mol as the energy of dissociation, from carbon, of an oxygen atom as an atom or atomic group of the mediating material. This makes it possible to reliably dissociate hydrogen atoms from the material to be treated and oxygen atoms from the mediating material, and emit light (light having a photon energy of about 128 kcal/mol or less) whose photon energy is lower than the dissociation energies of a carbon atom and fluorine atom, thereby preventing fluorine atoms from capturing hydrogen atoms.

That is, the point of this embodiment is to prevent the process of the comparative example by setting the wavelength of ultraviolet light to be emitted within the range of 221.4 to 351.6 nm.

In this embodiment, a liquid material which is an aggregate of a polymer having on its main chain an ether bonding group and a carbon fluoride CnFm (n=1, 2, 3, . . . , m=2n or 2n+1) group is used as the mediating material, and a material having on its surface a single bond of a carbon atom and hydrogen atom is used as the material to be treated. However, as the material to be treated, it is also possible to use an aggregate of an organic material containing a polymer having on its side chain a single bonding group of a carbon atom and hydrogen atom, or a mixture of an inorganic material and an organic material containing a polymer having on its side chain a single bonding group of a carbon atom and hydrogen atom.

A preferred example of the mediating material is a polymer consisting of —CnF2n—O—.

Also, as an ultraviolet light source for emitting such ultraviolet radiation, it possible to use an excimer light source such as KrF, XeCl, XeF, XeBr, or XeI.

Figure 7:
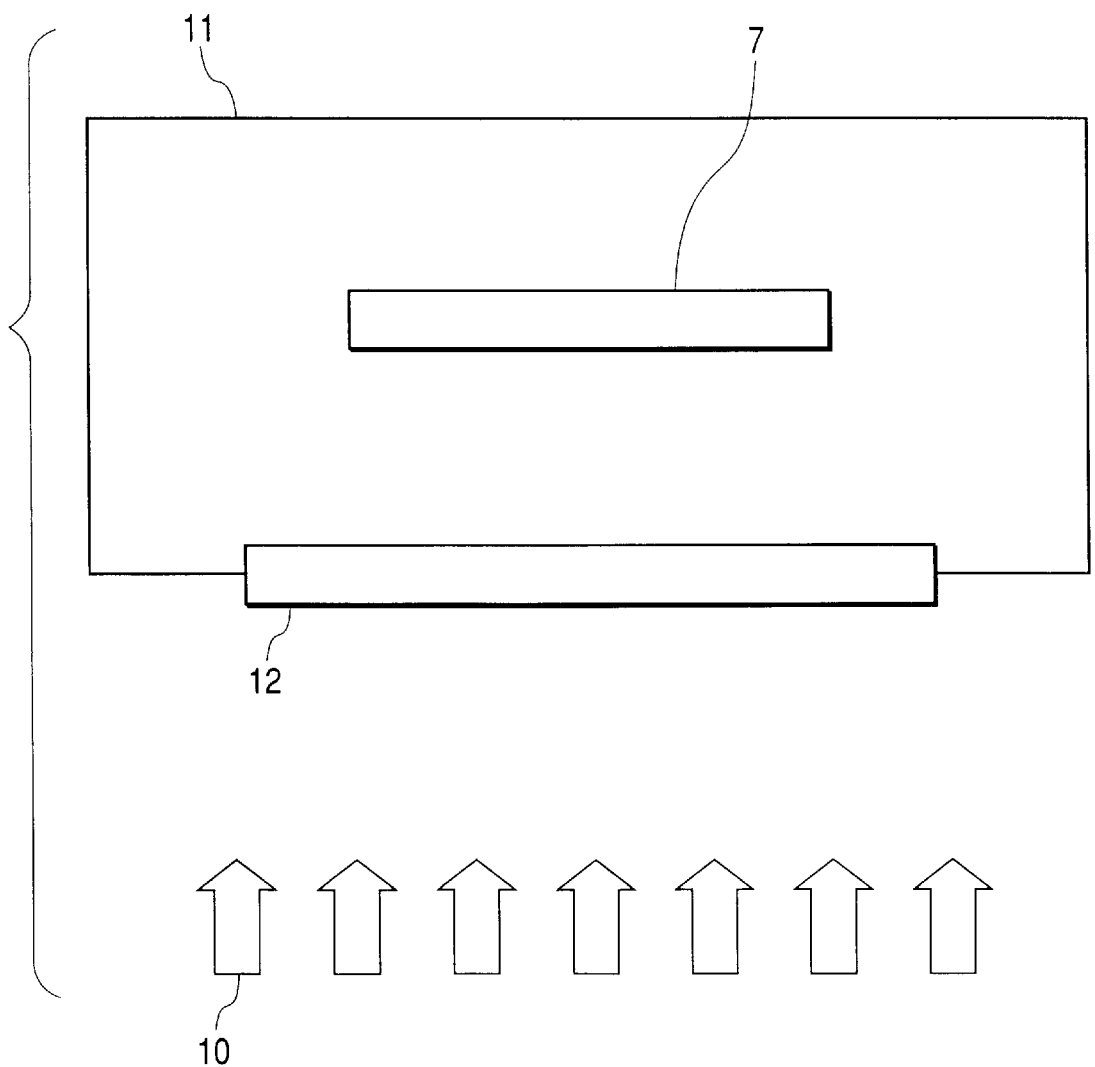
FIG. 7 is a schematic view of another means for performing the solid material surface treatment according to the present invention.

In this embodiment, light is emitted with the material to be treated in contact with the liquid mediating material. However, if the mediating material has a low molecular weight, as shown in FIG. 7, a surface treatment can also be performed by emitting light through a window 12 while the material to be treated is in contact with the mediating material in a gaseous state in a chamber 11.

EXAMPLE 1

Figure 1:
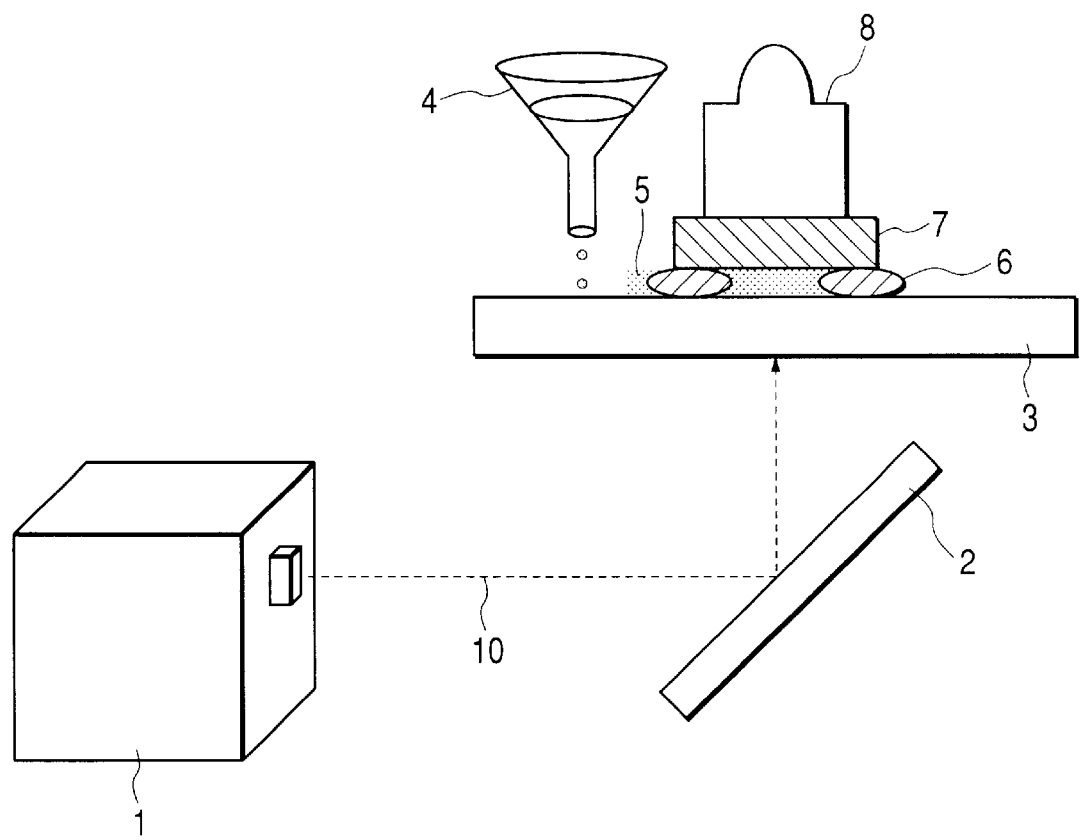
FIG. 1 is a schematic view showing a means for performing a solid material surface treatment according to the present invention.

FIG. 1 is a schematic view of a means for giving liquid repellency to the surface of a solid material by fluorination according to the present invention.

This means gives liquid repellency to one surface of a solid material 7 to be treated. The solid material 7 is set via spacers 6 to have a gap of about 20 to 100 μm from the surface of a window 3. This solid material 7 is pressed by a weight of 100 g, as a pressing member 8, so as not to move.

Figure 2:
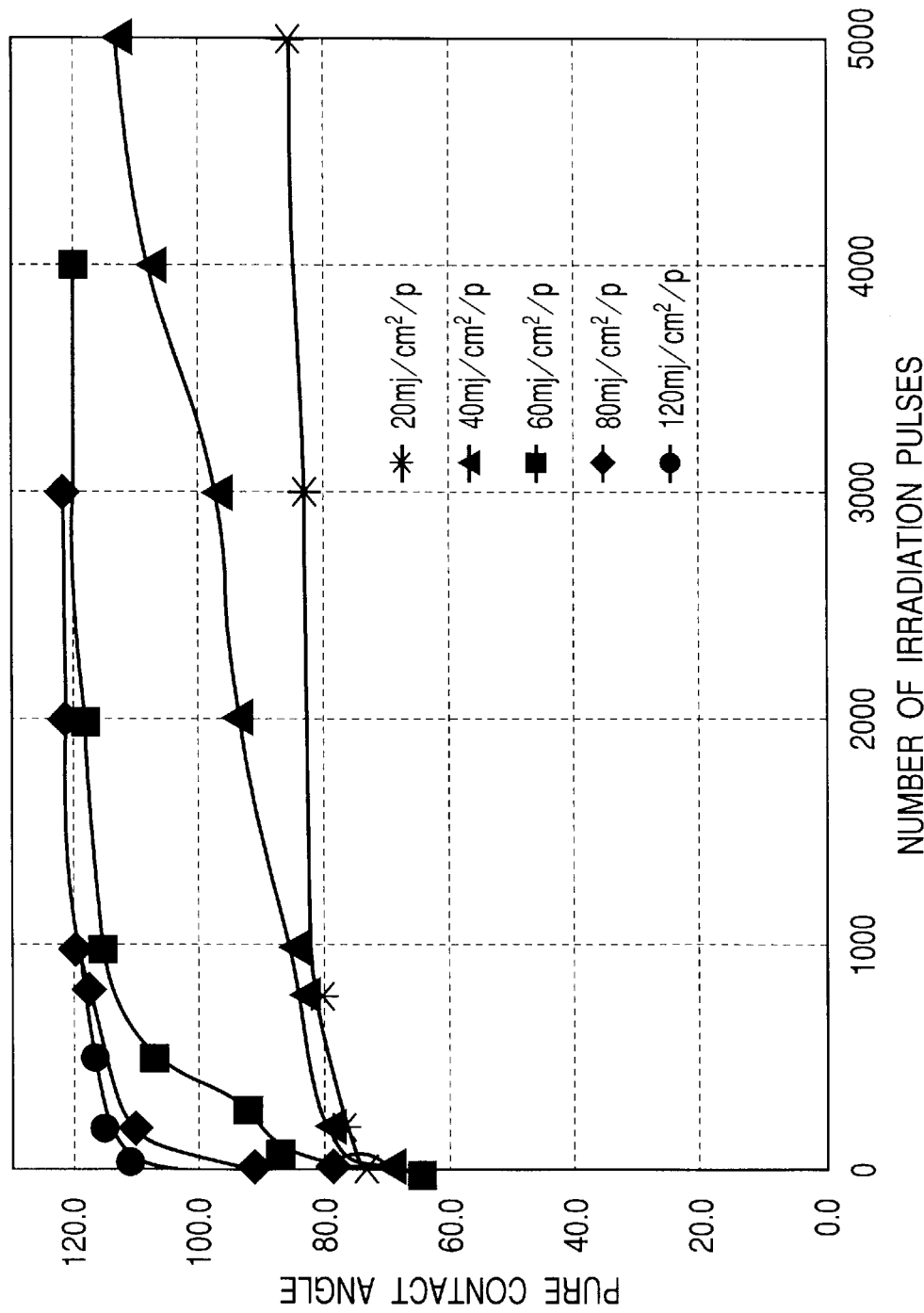
FIG. 2 is a graph showing the water repellency characteristics of an embodiment.

By using this means shown in FIG. 1, an exposed, developed negative photosensitive material (its main components are described in Table 1) containing an alicyclic epoxy resin as its main ingredient was used as the solid material 7, and perfluoropolyether (DEMNUM (trade name: manufactured by DAIKIN INDUSTRIES, LTD.) was used as a mediating liquid material 5 to be supplied between the solid material 7 and the window 3 by a mediating liquid supply means 4. In addition, a krypton fluorine excimer laser beam having an optical wavelength of 248.4 nm was used as ultraviolet radiation to be emitted which was light 10 emitted from a light emitting means 1 and reflected by a reflecting plate 2 to the interface between the solid material 7 and the mediating liquid material 5. FIG. 2 shows the water repellency characteristics in this case.

TABLE 1

| Item | Product name | Parts by weight |
|------|--------------|-----------------|
| Alicyclic epoxy resin | EHPE (DAICEL CHEMICAL INDUSTRIES, LTD.) | 100 |
| Added resin | 1,4-HFAB (Central Glass Co., Ltd.) | 20 |
| Silane coupling agent | A-187 (Nihon Uniker K.K.) | 5 |
| Photocation polymerizing catalyst | SP170 (ASAHI DENKA KOGYO K.K.) | 2 |

In the embodiment, the NOVALine KrF laser apparatus manufactured by Lambdaphysics was used as a laser apparatus.

As can be seen from FIG. 2, when the laser irradiation fluence was 20 to 120 mJ/cm$^2$/pulse, the contact angle of pure water increased to a larger water repellency in accordance with the irradiation exposure amount. This pure water contact angle was saturated at about 120° and did not increase or decrease after that even when the exposure amount was increased. Although not plotted on the graph in FIG. 2, when the fluence was 40 mJ/cm$^2$/pulse, a pure water contact angle of about 120° was obtained by about 8,000 laser irradiation pulses; when the fluence was 20 mJ/cm$^2$/pulse, a pure water contact angle of about 120° was obtained by about 50,000 laser irradiation pulses.

EXAMPLE 2

Similar to Example 1, the means explained in FIG. 1 was used to perform a surface treatment under the same conditions as in Example 1 by using polystyrene as a material 7 to be treated. Consequently, the contact angle of pure water increased to a larger water repellency, was saturated at about 120°, and did not increase or decrease after that even when the exposure amount was increased.

EXAMPLE 3

Similar to Example 1, the means explained in FIG. 1 was used to perform a surface treatment under the same conditions as in Example 1 by using polyimide as a material 7 to be treated. Consequently, the contact angle of pure water increased to a larger water repellency, was saturated at about 120°, and did not increase or decrease after that even when the exposure amount was increased.

EXAMPLE 4

Similar to Example 1, the means explained in FIG. 1 was used to perform a surface treatment under the same conditions as in Example 1 by using polysulfone as a material 7 to be treated. As a consequence, the contact angle of pure water increased to a larger water repellency, was saturated at about 120°, and did not increase or decrease after that even when the exposure amount was increased.

EXAMPLE 5

Similar to Example 1, the means explained in FIG. 1 was used to perform a surface treatment under the same conditions as in Example 1 by using, as a material 7 to be treated, an exposed and developed negative photosensitive resin (its main components are described in Table 1) containing as its main ingredient an alicyclic epoxy resin containing a silicon filler, as a mixture of an inorganic material and an organic material containing a polymer having on its side chain a single bonding group of a carbon atom and hydrogen atom. As a consequence, the contact angle of pure water increased to a larger water repellency, was saturated at about 120°, and did not increase or decrease after that even when the exposure amount was increased.

EXAMPLE 6

Similar to Example 1, the means explained in FIG. 1 was used to perform a surface treatment under the same conditions as in Example 1 by using, as a material 7 to be treated, polystyrene containing a glass filler, as a mixture of an inorganic material and an organic material containing polymer having on its side chain a single bonding group of a carbon atom and hydrogen atom. Consequently, the contact angle of pure water increased to a larger water repellency, was saturated at about 120°, and did not increase or decrease after that even when the exposure amount was increased.

EXAMPLE 7

Similar to Example 1, the means explained in FIG. 1 was used to perform a surface treatment under the same conditions as in Example 1 by using polyimide containing a glass filler as a material 7 to be treated. Consequently, the contact angle of pure water increased to a larger water repellency, was saturated at about 120°, and did not increase or decrease after that even when the exposure amount was increased.

EXAMPLE 8

Similar to Example 1, the means explained in FIG. 1 was used to perform a surface treatment under the same conditions as in Example 1 by using polysulfone containing a glass filler as a material 7 to be treated. Consequently, the contact angle of pure water increased to a larger water repellency, was saturated at about 120°, and did not increase or decrease after that even when the exposure amount was increased.

COMPARATIVE EXAMPLE

Figure 3:
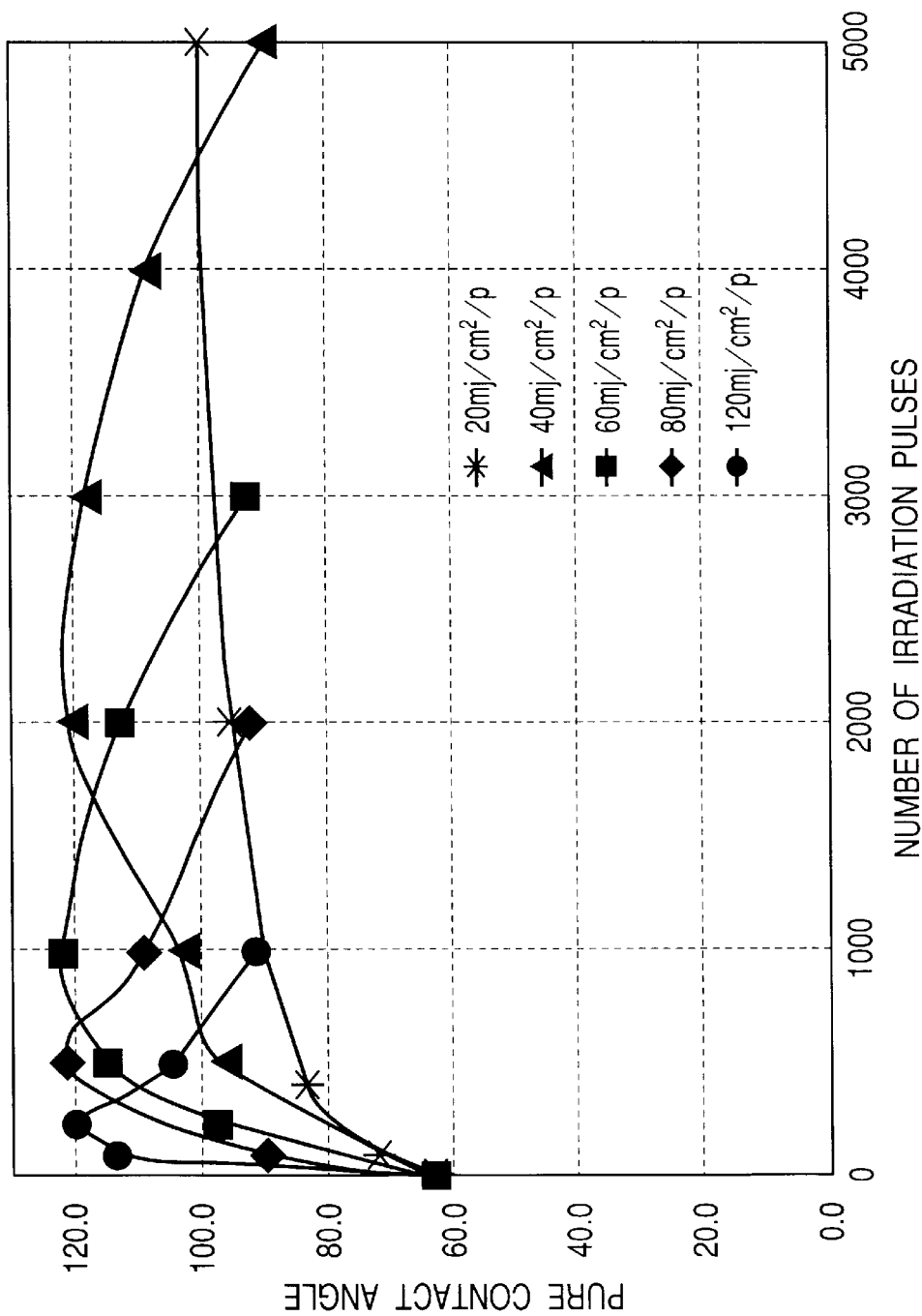
FIG. 3 is a graph showing the water repellency characteristics of a comparative example.

By using the means shown in FIG. 1 as in Example 1, an exposed and developed negative photosensitive material (its main components are described in Table 1) containing an alicyclic epoxy resin as its main ingredient was used as a material 7 to be treated, perfluoropolyether (DEMNUM (trade name: manufactured by DAIKIN INDUSTRIES, LTD.) was used as a mediating liquid material 5, and an argon fluorine excimer laser beam having an optical wavelength of 193 nm (photon energy=about 147 kcal/mol) was used as ultraviolet radiation to be emitted. FIG. 3 shows the water repellency characteristics in this case.

As can be seen from FIG. 3, when the laser irradiation fluence was 20 to 120 mJ/cm$^2$/pulse, the contact angle of pure water once increased to a larger water repellency and reached about 120° in accordance with the irradiation exposure amount. However, this contact angle decreased when the exposure amount was increased after that. Although not plotted on the graph in FIG. 3, even when the fluence was 20 mJ/cm$^2$/pulse, the pure water contact angle reached its peak of about 120° when the number of laser irradiation pulses was about 10,000, and decreased when the number of laser irradiation pulses was about 20,000.

In each of the examples and comparative example described above, 500 samples were continuously formed and their contact angles were measured. Consequently, samples having contact angles of 120° or more accounted for 98% in each example and accounted for 75% in the comparative example.

This is presumably because the ultraviolet dose was reduced by gas deterioration of the excimer laser oscillator owing to the continuous processing. However, each example of the present invention had a region in which a surface treatment could be performed with stable performance regardless of changes in the dose.

The surface conditions in this state were analyzed by ESCA. As a consequence, in each example of the present invention the surfaces were as shown in FIG. 6B, whereas in the comparative example some surfaces were as shown in FIG. 6C. As is evident from these surface conditions, the surface of the comparative example had a portion in which no fluorine atoms were present, and the water repellency deteriorated only in this portion compared to the examples of the present invention. Note that FIG. 6A is a schematic view showing the surface condition of a material to be treated before substitution.

Note also that when a photomask patterned by using a metal film such as a chromium film or by using a dielectric substance interference reflecting film is used as the window 3, only predetermined portions of the surface of the solid material 7 to be treated can be given liquid repellency.

As has been explained above, the present inventors studied the substitution mechanism and have found a novel substitution mechanism, thereby deriving a surface treatment stabilization method capable of efficiently performing substitution, with the above configuration, without producing any variations in the surface treatment due to the thickness of a mediating material in contact with a material to be treated. In particular, the present inventors have found a method by which a physical property irreversible reaction process logically holds in a method of adding high liquid repellency to the surface of a plastic material having a C—H bond in its surface layer. Additionally, application regions are extended by maintaining both the surface characteristics and bulk characteristics.

What is claimed is:

1. A method for treating a surface of a member comprising:

irradiating with light a field including an interface between the member and a mediating material so that an atom or an atomic group of the member and an atom or an atomic group of the mediating material at the interface are excited for substitution of the atom or the atomic group of the member by the atom or the atomic group of the mediating material, thereby treating the surface of the member, wherein the mediating material causes substantially no interaction upon irradiation with light when used separately from the member.

2. A method according to claim 1, wherein the mediating material is a liquid.

3. A method according to claim 1, wherein the mediating material is a gas.

4. A method according to claim 1, wherein a bond energy between the atom or the atomic group of the member and the atom or the atomic group of the mediating material is greater than (i) a bond energy between the atom or the atomic group of the member and a matrix atom of the mediating material and (ii) a bond energy between the atom or the atomic group of the mediating material and the matrix atom of the mediating material.

5. A method according to claim 1, wherein the irradiating light has a wavelength having photon energy greater than (i) a bond energy between the atom or the atomic group of the member and a matrix atom of the mediating material and (ii) a bond energy between the atom or the atomic group of the mediating material and the matrix atom of the mediating material.

6. A method for treating a surface of a member having a carbon atom singly bonded to a hydrogen atom on the surface, the surface being in contact with a liquid mediating material, which is an aggregate of a polymer having on a main chain thereof an ether bonding group and a carbon fluoride CnFm (n=1, 2, 3, . . . , m=2n or 2n+1) group, the method comprising:

irradiating a field including the surface of the member in contact with the liquid mediating material with ultraviolet radiation having a wavelength of 221.4 to 351.6 nm so as to substitute the hydrogen atom singly bonded to the carbon atom on the surface of the member with the carbon fluoride group of the liquid mediating material, thereby modifying the surface of the member.

7. A method according to claim 6, wherein the member is an aggregate of an organic material containing a polymer having on a side chain thereof the carbon atom singly bonded to the hydrogen atom.

8. A method according to claim 6, wherein the member is a mixture of an inorganic material and an organic material containing a polymer having on a side chain thereof the carbon atom singly bonded to the hydrogen atom.

9. A method according to claim 6, wherein the liquid mediating material is a polymer consisting of —CnF2n—O—.

10. A method according to claim 6, wherein the liquid mediating material is F—$(CF_2CF_2CF_2O)_n$$CF_2CF_3$, where n is an integer.

11. A method according to claim 6, wherein an ultraviolet light source for the ultraviolet irradiation is an excimer light source selected from the group consisting of KrF, XeCl, XeF, XeBr, and XeI.

12. A method according to claim 6, wherein when the member contains as a main component thereof a polymer having a single bond of carbon atoms as a main chain thereof, an ultraviolet dose for the ultraviolet irradiation is not less than 16 $mJ/cm^2$ in a treatment at an ultraviolet wavelength of 221.4 nm or not less than 10 $mJ/cm^2$ in a treatment at an ultraviolet wavelength of 351.6 nm.

13. A method according to claim 6, wherein the surface of the member is irradiated with the ultraviolet radiation from the side of the liquid mediating material via a photomask formed by patterning a metal film into a predetermined pattern on a substrate which can be penetrated by the ultraviolet radiation.

14. A method according to claim 13, wherein a substrate of the photomask is a material selected from the group consisting of synthetic quartz, rock crystal, calcium fluoride, magnesium fluoride, sapphire, and diamond.

* * * * *